United States Patent [19]

Mizuhara

[11] Patent Number: 4,630,767

[45] Date of Patent: Dec. 23, 1986

[54] METHOD OF BRAZING USING A DUCTILE LOW TEMPERATURE BRAZING ALLOY

[75] Inventor: Howard Mizuhara, San Mateo, Calif.

[73] Assignee: GTE Products Corporation, Stamford, Conn.

[21] Appl. No.: 765,832

[22] Filed: Aug. 15, 1985

Related U.S. Application Data

[63] Continuation of Ser. No. 757,962, Sep. 20, 1984, which is a continuation of Ser. No. 394,226, Jul. 1, 1982, abandoned.

[51] Int. Cl.$^4$ ............................................. B23K 31/02
[52] U.S. Cl. ................................ 228/122; 228/263.12
[58] Field of Search ............... 420/502, 587; 228/121, 228/122, 263.12; 428/606

[56] References Cited

U.S. PATENT DOCUMENTS

| | | | |
|---|---|---|---|
| 2,739,375 | 9/1952 | Coxe | 228/121 |
| 3,001,269 | 9/1954 | Moore et al. | 228/122 |
| 4,591,535 | 5/1986 | Mizuhara | 420/502 |

FOREIGN PATENT DOCUMENTS

| | | | |
|---|---|---|---|
| 59-232692 | 12/1984 | Japan | 228/122 |
| 1170364 | 11/1969 | United Kingdom | 420/502 |

OTHER PUBLICATIONS

Keenan et al., General College Chemistry 4th Ed., 1971, p. 151.

*Primary Examiner*—L. Dewayne Rutledge
*Assistant Examiner*—Deborah Yee
*Attorney, Agent, or Firm*—James Theodosopoulos

[57] ABSTRACT

Titanium-silver alloys containing specified amounts of silver and titanium and controlled amounts of copper, aluminum and mixtures thereof are suitable for brazing ceramics, other non-metallic and metallic materials. These alloys also may contain controlled amounts of tin, palladium, indium and mixtures thereof.

2 Claims, No Drawings

METHOD OF BRAZING USING A DUCTILE LOW TEMPERATURE BRAZING ALLOY

This application is a continuation of application Ser. No. 757,962 filed Sept. 20, 1984 which is a continuation of 394,226 filed July 1, 1982, now abandoned.

FIELD OF INVENTION

This invention relates to brazing alloys. More particularly it relates to low temperature brazing alloys containing titanium.

BACKGROUND

An alloy foil sold under the trademark of Ticusil by the Wesgo Division of GTE Products Corporation, Belmont, Calif. contains 4.5% by weight of titanium, 68.8% by weight of silver and 26.7% by weight of copper. This composite alloy, while having the ability to wet various ceramic materials and has a relatively low brazing temperature, is not ductile and can not be rolled to a foil in a satisfactory manner and upon brazing contains a brittle dispersed phase.

Other titanium containing alloys containing higher amounts titanium are known to wet ceramics. These can be made into a ductile foil form by rapid solidification techniques, however, upon brazing will form a joint containing a brittle dispersed phase.

SUMMARY OF THE INVENTION

Reactive metal-silver alloys containing specified amounts of silver and a reactive metal and controlled amounts of copper or aluminum or mixtures thereof also have liquidus temperatures in the range of from about 750° C. to about 950° C. are ductile and after brazing are relatively free of hard dispersed phases. These alloys also may contain as optional ingredients controlled amounts of tin, palladium, indium and mixtures thereof.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

Within the context of this application the term "reactive metal" means titanium, vanadium, zirconium and mixtures thereof.

The amount of the reactive metal in a reactive-silver alloy containing copper or aluminum or mixtures thereof can not appreciably exceed 4% by weight and achieve a ductile material which upon brazing is free of dispersed phases. Table I below shows the effect upon hardness and ductility of various Ti-Ag-Cu alloys.

TABLE I

| % Titanium (by weight) | % Ag (by weight) | % Cu (by weight) | Knopp Hardness 50 g | Ductility |
| --- | --- | --- | --- | --- |
| 0 | 72 | 28 | 140 | ductile |
| .5 | 71.6 | 27.9 | 140 | ductile |
| 1.0 | 71.3 | 27.7 | 145 | ductile |
| 3.0 | 69.8 | 27.2 | 140 | ductile |
| 4.0 | 69.1 | 26.9 | 130 | ductile |
| 4.5 | 68.8 | 26.7 | 201(M) 664(D) | cracks 2 phases |
| 5.0 | 68.4 | 26.6 | 190(M) 530(D) | cracks 2 phases |

M = Matrix
D = Dispersed Phase

As can be seen from the data in Table I about 4% by weight of titanium is the upper weight limit on the amount of titanium that can be present in the Ti-Ag-Cu alloy system and achieve ductility. Similar results upon ductility are achieved when the Ag-Cu ratio changes from the 72% Ag-28% Cu eutectic. Additionally similar ductility results are achieved in the Ti-Ag-Al system.

When vanadium or zirconim or mixtures thereof is the reactive metal the material is not as ductile as when titanium is the reactive metal. The presence of brittle dispersed phases relates to the level of the reactive metal and is independent of the particular reactive metal used. When the reactive metal content is above about 2% by weight when vanadium, zirconium or mixtures thereof are used, rapid solidification manufacture techniques or intermediate annealing is required to produce a ductile foil. Titanium is the preferred reactive metal.

In many brazing applications it is desired to utilize relatively low brazing temperatures, that is the liquidus of the alloy should be in the 600° C. to 950° C. range thus the lower brazing temperatures can be utilized. If desired, in addition to the titanium-silver-copper or aluminum or mixtures of Cu and Al, additional metals of tin, palladium, indium or mixtures thereof can be included as optional ingredients.

While the liquidus temperature is in the ranges specified, the flow temperature, that is the temperature at which the alloys of this invention flow and wet the materials to be brazed is important in utilizing the materials using conventional brazing techniques. If the materials to be brazed can withstand about 900° C., it is preferred to utilize brazing temperatures in excess of 900° C. even if the particular brazing alloy has a lower liquidus temperature. The flow temperatures for the products of this invention generally range from about 900° C. to about 1050° C.

The amount of reactive metal in the alloys is from about 0.25% by weight to about 4% by weight with from about 1.0% by weight to about 2% by weight being preferred. That amount of silver is from about 20% by weight to about 98.75% by weight. It is preferred that the silver content be between about 60% by weight and about 75% by weight.

When copper and aluminum are present in the alloy, the weight percent of these elements can vary from about 1% by weight to about 70% by weight, however, the relative amounts of silver and copper, aluminum or mixture thereof, along with the optional ingredients of tin, palladium and indium are adjusted to achieve a liquidus temperature within the range of from about 600° C. to about 950° C. In the Ti-Ag-Cu system without other metals present it is preferred that the eutectic having a weight ratio of Ag:Cu of about 72:28 be employed. The preferred copper weight range therefore varies from about 20% by weight to about 40% by weight. The preferred aluminum content is from about 4% by weight to about 10% weight.

The optional second metal additions include tin, palladium, indium and mixtures thereof. These metal additions can vary from about 1% by weight to about 30% by weight of the alloy. When tin is utilized it is preferrably added the weight range of from about 3% by weight to about 15% weight. When palladium is utilized, the preferred amount of palladium is from about 5% by weight to about 25% by weight. When indium is utilized, the preferred amount is from about 2% to about 15% by weight.

To more fully illustrate the subject invention the following detailed examples are presented. All parts, percentages and proportions are by weight unless otherwise indicated.

EXAMPLE I

Four alloys containing about 1%, 2%, 3% and 4% titanium are prepared using skull melting equipment and a base alloy of the 72% silver-28% copper eutectic. These four alloys are rolled down to a workable, ductile, 5 mil thick foil.

A portion of each of the foils is placed between two pieces of 97% alumina ceramic which are ⅜" wide by 1¼" long by 0.025" thick. These four samples are brazed at about 920° C. at $10^{-5}$ mm Hg for about 5 minutes. Suitable brazed joints are achieved with all four alloys.

EXAMPLE 2

An alloy containing about 2% titanium, about 59% silver, about 29% copper and about 10% tin is prepared and rolled to a foil having a thickness of about 10 mils. The foil is workable and ductile and is used to braze alumina, as in Example 1, except that a brazing temperature of about 900° C. is used. A suitable brazed joint is exhibited.

EXAMPLE 3

An alloy containing about 2% titanium, about 67% silver, about 26% copper and about 5% palladium is prepared and rolled to a foil having a thickness of about 4 mils. The foil is cut into a ¼ inch wide ribbon and a piece of this ribbon is placed between a piece of metallic alloy containing about 53.8% iron, 29% nickel, 17% cobalt and 0.2% manganese known as Kovar and a piece of 97% alumina. The dimension of the Kovar are about ½" wide by about ¾" by 0.010" thick. The dimensions of the alumina are about ½" wide by about ¾" long by about 0.030" thick. The Kovar, brazing foil and alumina assembly is heated to about 1020° C. under about $10^{-5}$ mm Hg pressure for about 10 minutes. The brazed joint is sound.

EXAMPLE 4

An alloy containing about 3% titanium, about 4.5% aluminum and about 92.5% silver is prepared by convention powder metallurgy techniques. A foil having a thickness of about 4 mils is prepared using an intermediate vacuum anneal. When placed between two pieces of 97% alumina and brazed at about 1050° C. at $10^{-5}$ mm Hg for about 10 minutes, a suitable brazed joint is formed.

EXAMPLE 5

Following the procedure given in Example 4, an alloy containing about 0.5% titanium, about 10% indium, about 24.5% copper and about 65% silver is prepared in the form of a foil. The foil having a thickness of about 6 mils is suitable for brazing copper to alumina using a brazing temperature of about 850° C. at $10^{-5}$ mm Hg pressure and a time of about 10 minutes.

EXAMPLE 6

Silicon nitride solde under the tradename of SNW-1000 by the Wesgo Division of GTE Products Corporation, Belmont, Calif. is satisfactorily brazed to mild steel at a brazing temperature of about 920° C. at $10^{-5}$ mm Hg pressure using a brazing foil of about 3 mils thickness and having composition of about 2% titanium, about 27.4% copper and about 70.6% silver.

EXAMPLE 7

The following alloys are prepared as in Example 1.

| 72% Ag - 28% Cu | 99.0% | 98.0% | 97.0% | 96.0% |
| --- | --- | --- | --- | --- |
| Ti | 0.5% | 1.0% | 1.5% | 2.0% |
| Zr | 0.5% | 1.0% | 1.5% | 2.0% |

The rolled foil is placed between two alumina substrates and brazed. The use of Ti Zr 1:1 ratio shows reduced flow temperature compared to Ti alloy and flows at 880° C.

While there has been shown and described what are at present considered the preferred embodiments of the invention, it will be obvious to those skilled in the art that various changes and modifications may be made therein with out departing from the scope of the invention as defined by the appended claims.

What is claimed is:

1. The method of joining silicon nitride to another part by brazing comprising the steps of:
preparing a brazing alloy composition consisting essentially of 20 to 98.75 weight percent silver, 20 to 40 weight percent copper, and 0.25 to 4 weight percent titanium, said composition having a liquidus temperature in the range from about 750° to 950° C.; rolling the brazing alloy composition down to a thin foil; disposing brazing alloy in said thin foil form between an assembly comprising the silicon nitride and the part to which the silicon nitride is to be brazed; and heating said assembly in vacuum to a temperature at which the foil melts, thereby brazing the silicon nitride to said part.

2. The method of joining silicon nitride to a mild steel part by brazing comprising the steps of:
preparing a brazing alloy composition consisting of 70.6 weight percent silver, 27.4 weight percent copper, and 2 weight percent titanium, said composition having a liquidus temperature in the range from about 750° to 950° C.; rolling the brazing alloy composition down to a 3 mil thick foil; disposing brazing alloy in said foil form between an assembly comprising the silicon nitride and a mild steel part to which the silicon nitride is to be brazed; and heating said assembly in vacuum at about 920° C. thereby brazing the silicon nitride to the mild steel part.

* * * * *